M. V. LIDDELL.
MOTOR VEHICLE FRAME.
APPLICATION FILED OCT. 25, 1918.
1,303,339.
Patented May 13, 1919.
3 SHEETS—SHEET 1.
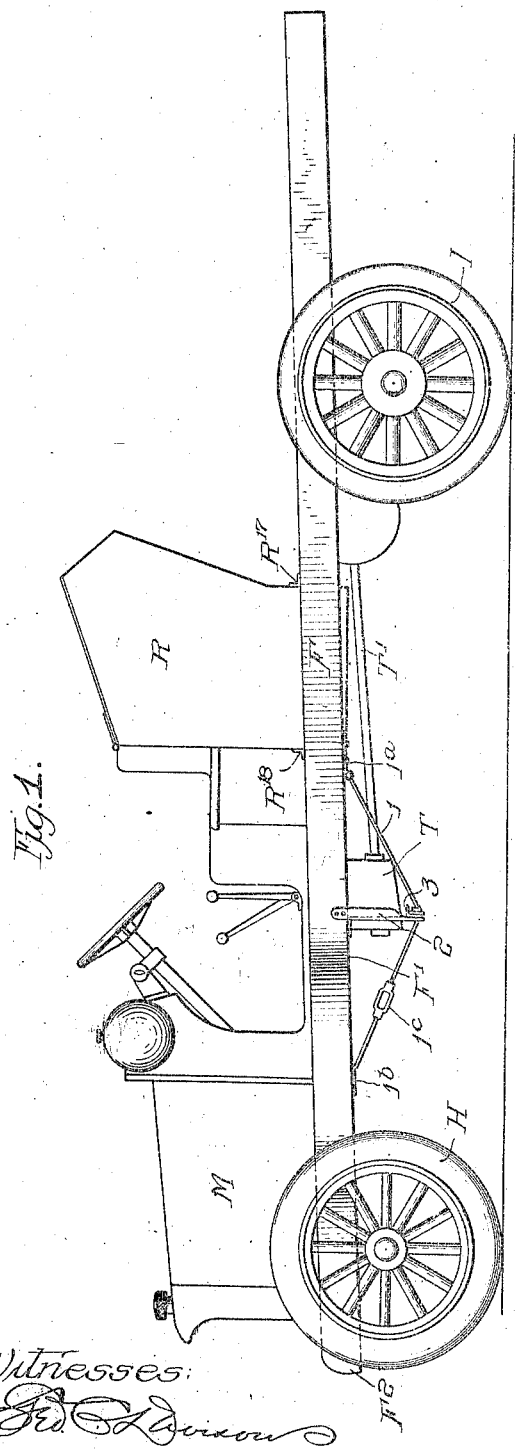
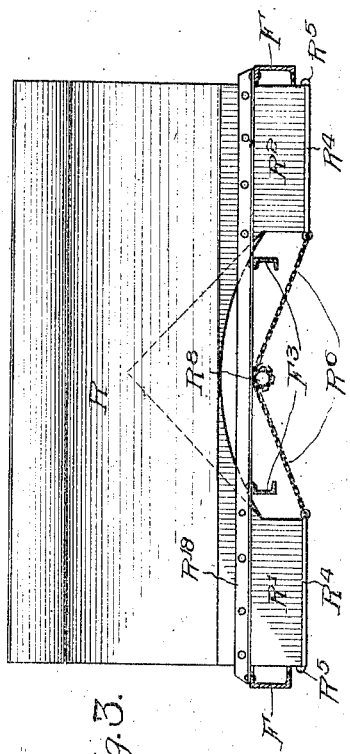
Inventor:
M. Volney Liddell
By Wilkinson & Huxley
Attys.
Witnesses:

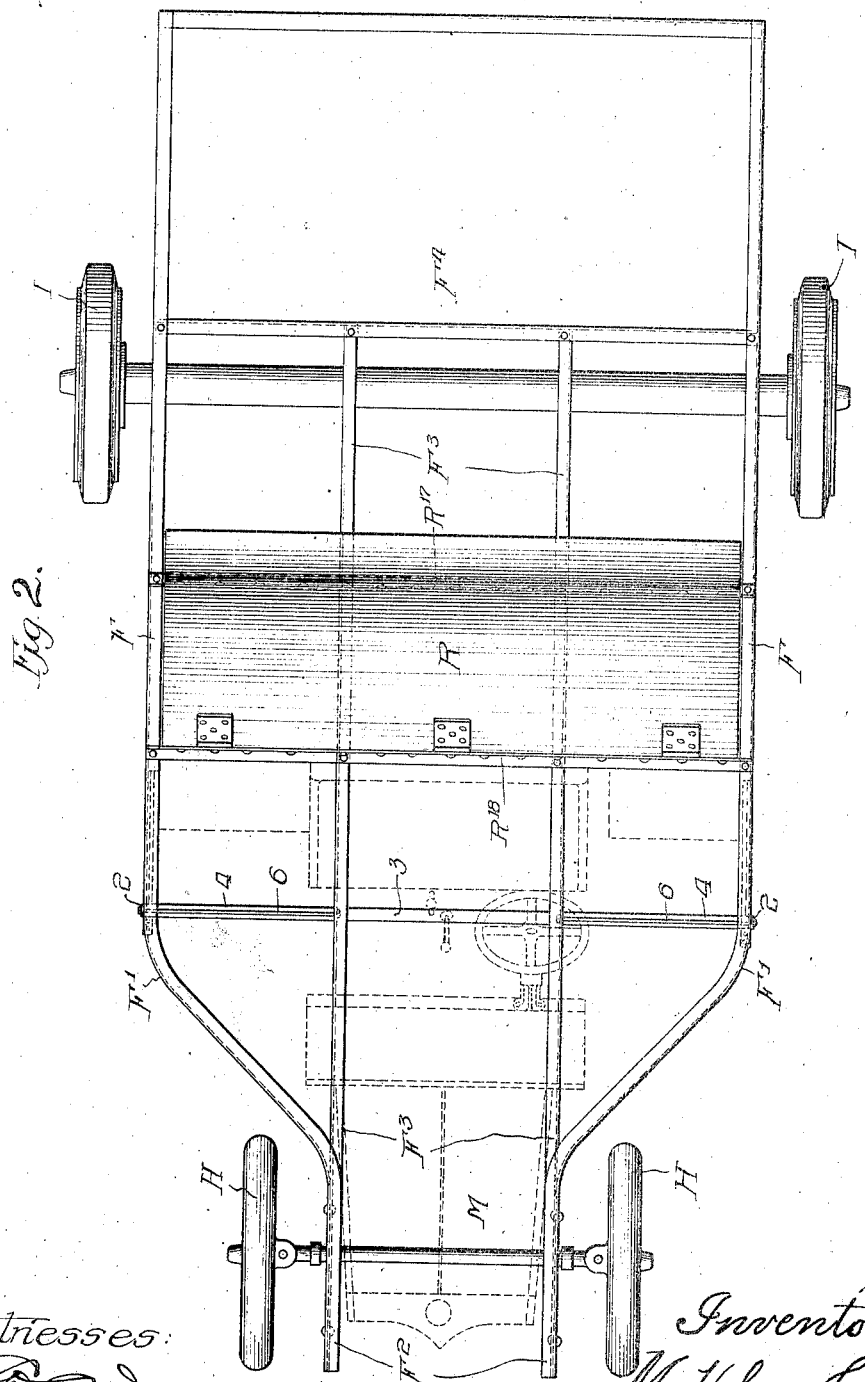

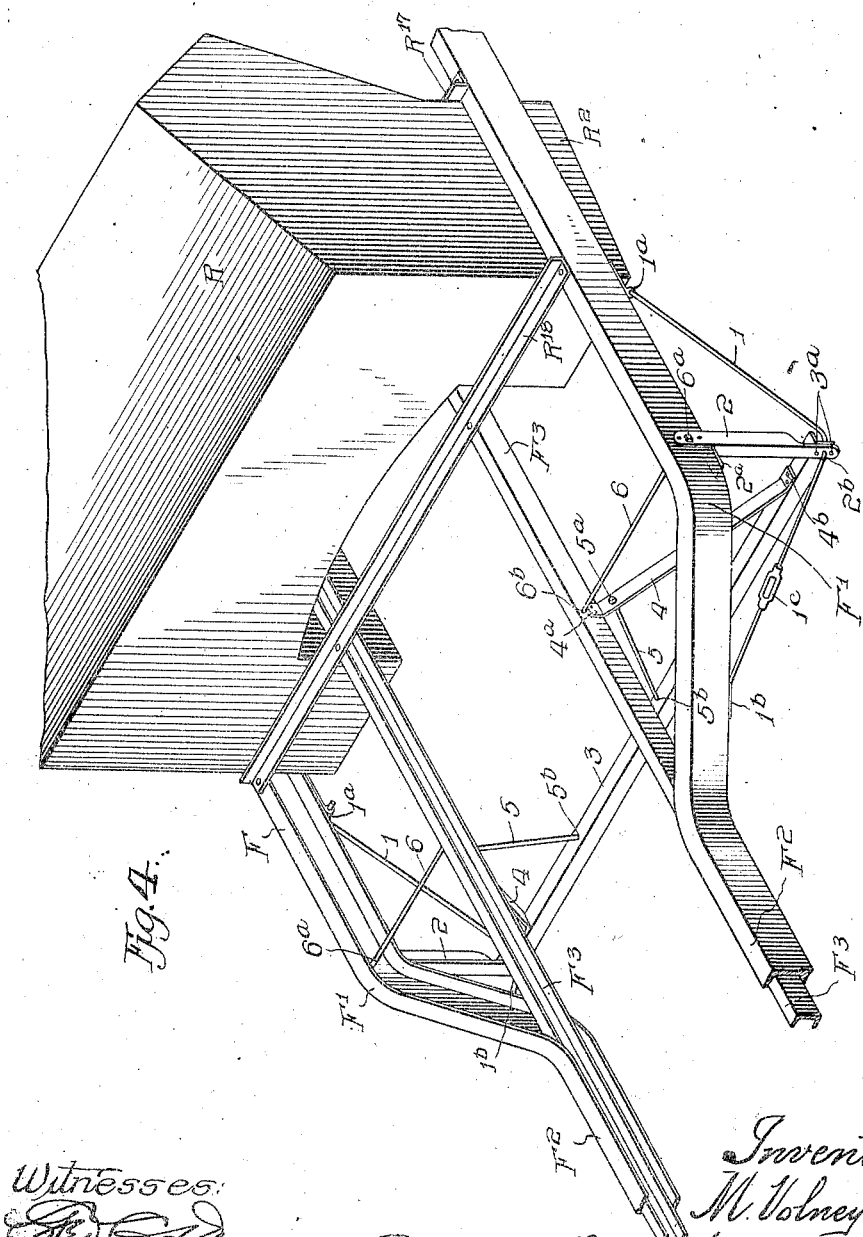

UNITED STATES PATENT OFFICE.

MOSES VOLNEY LIDDELL, OF HARVEY, ILLINOIS, ASSIGNOR TO AUSTIN MANUFACTURING CO., OF CHICAGO, ILLINOIS, A CORPORATION OF ILLINOIS.

MOTOR-VEHICLE FRAME.

1,303,339.          Specification of Letters Patent.     Patented May 13, 1919.

Application filed October 25, 1918. Serial No. 259,643.

*To all whom it may concern:*

Be it known that I, MOSES VOLNEY LIDDELL, a citizen of the United States, residing at Harvey, in the county of Cook and State of Illinois, have invented certain new and useful Improvements in Motor-Vehicle Frames, of which the following is a specification.

This invention relates to frame construction designed primarily for motor propelled vehicles, such as trucks, sweeping machines, or other self propelled vehicles designed to carry heavy loads of material or machinery.

The primary object of the invention is to provide a frame construction that will not only develop high carrying capacity upon a relatively long wheel base, but great strength and rigidity under stresses incident to longitudinal thrust transmitted from the rear area, which carries the driving wheels, to the forward area, which carries the steering wheels, and that will also be capable of resisting torsional stresses due to uneven surfaces upon which the front and rear wheels may rest, and transverse stresses which develop from the shocks and jars of uneven roadbed over which the vehicle may travel.

A secondary object of the invention is to develop and maintain the conditions above outlined in a vehicle frame, which has its transverse dimension materially reduced near its forward or steering end, as by developing definite offsets or deflections in its main side rails.

The invention will be more fully understood by reference to the accompanying drawings, in which—

Figures 1, 2, and 3, are, respectively, a side elevation, plan view, and transverse section in a vertical plane immediately forward of the receptacle of Figs. 1 and 2, of a motor propelled vehicle embodying a frame in which the several features of the present invention are incorporated; and Fig. 4 is a perspective view of the principal members of the frame and their trussing elements.

The present invention is illustrated in a motor vehicle designed particularly for a power-driven pick-up sweeper which forms the subject-matter of an application filed by be me on July 24, 1918, (Serial No. 246,437), and one of the elements of which is a box-like structure or receptacle R which serves as a sweepings receptacle in that organization, but which is here included as typical of a carrying receptacle in a general sense, and which enters into the present organization as an additional element of strength, or bracing, primarily in a horizontal plane, and as a result of its box-like construction projecting between and secured to members of the frame construction herein claimed, as will hereinafter appear.

Utilizing, for convenience in comparison, the reference characters of my aforesaid co-pending application so far as corresponding parts are found in the present application, F represents the main side rails of a chassis or motor vehicle frame, which are deflected inwardly at $F^1$ to develop a front end $F^2$, of reduced transverse dimension, to receive the front steering and supporting wheels H. $F^3$ are inner rails which coincide with or are lapped upon the inset forward portions $F^2$ of the main rails, and extend rearwardly therefrom to provide inner supporting and bracing frame members extending well toward the rear of the structure where they meet and are secured to a transverse rail $F^4$ secured at its ends to the main rails F. M represents the motor hood; T the transmission; and $T^1$ the driving shaft of a power installation which may be of any standard construction, and which need not be further described herein. I represents the rear supporting and driving wheels of the vehicle.

With the particular form of side rail shown, vertical load over the angle $F^1$ develops a strong torsional stress in the side rail. To prevent the development of undue strain from this stress, a tension member 1, firmly anchored at its ends $1^a$, $1^b$ in front and rear of the angle $F^1$, carries a vertical sustaining strut 2, which is secured to the side rail at $2^a$ near the said angle, and is provided with a bearing $2^b$ for the tension member 1. This strut is preferably made of angle iron split near its upper end so as to present one of its webs upon the face of the rail and its other upon the underside thereof, in order to accurately locate the end of the strut with relation to the rail and relieve the securing rivets from shearing strains; the lower end of the strut having the webs flattened into the same plane in order to make a more substantial body of metal to receive the tension member 1 threaded therethrough. Inasmuch as the position of the strut 2 is offset outwardly from the straight line joining the attaching points $1^a$, $1^b$ of the tension member 1, a spreading beam 3 is introduced between the lower ends of the struts 2, upon the respective sides of the frame, to resist inward displacement of the lower ends of the struts, said beam being riveted at 3ª to the lower ends of the struts, and in order to hold said beam against endwise displacement it is provided with braces 4 located diagonally between the beam and the inner rails F³, said braces being preferably in the form of bars capable of resisting compression as well as tension, and the bracing being reinforced by tension braces 5 extending from the upper ends of the rear braces 4, where they are secured by nuts 5ª, downwardly and inwardly to points 5ᵇ where they are secured to the spreading beam 3.

In addition to the foregoing elements, horizontal tie rods 6 are introduced transversely between the outer rails F¹ and inner rails F³, preferably in the vertical planes of the struts 2 and the spreading beam 3, and these tie rods sustain the inner rails F³ against inward thrust through the bar braces 4 and inward tension imposed through the bracing rods 5. From the described disposition of parts, it will be obvious that not only are the outer rails F firmly trussed against the vertical load at their angles F², but the frame as a whole is strongly trussed in a transverse vertical plane adjacent to said angles.

The form of the side rails F with the more or less abrupt inward deflections that develop the narrow front end, would subject the outer rails to undesirable bending strains at the angles F¹ if they were not properly sustained. To support the forward end of the frame longitudinally and better adapt it to transmit the thrust from the rear driving wheels to the forward steering wheels, the inner rails F³, which, as already stated, are merged with the inset forward ends of the outer rails at the front end of the frame, are extended straight rearwardly and secured at such points as will effectively distribute to the rear portion of the frame the longitudinal load imposed upon them. Such distribution of the load is mainly through the medium of the transverse beam F⁴, although the structure is also largely sustained by the box-like receptacle R which fits between the side rails F and the front and rear bars R¹⁷, R¹⁸, which support said receptacle upon the frame. The receptacle R and the bars R¹⁷, R¹⁸, constitute in themselves a rigidly framed structure that resists distortion of its form, and therefore transmits longitudinal thrust of the inner rails F³ to the outer rails F. Moreover, the rigid box-like structure R, R¹⁷, R¹⁸, fitting between the side rails F, greatly stiffens the form of the whole frame in a horizontal plane, and spaces the side rails apart at the point 1ª where the tension members are attached to the side rails.

The form of receptacle R shown, and as more clearly understood from Fig. 3, namely, with the two depending box-like legs R¹, R², which enter between the outer rails F, is particularly adapted to serve the purposes above described, although said form is primarily incident to the development of a double hopper bottom in the receptacle. R⁴ represent doors closing the depending legs R¹, R², of the receptacle R, said doors being hinged at R⁵, and being held closed by chains R⁶, controlled by a winding shaft R⁸. These parts, however, have no particular bearing upon the invention herein claimed.

I claim:

1. In a vehicle frame, the combination of side rails having inward deflections at intermediate points in their length, struts secured to said rails near their deflections, and tension members secured to the rails in front and rear of said deflections and sustaining said struts.

2. In a vehicle frame, the combination of side rails having inward deflections at intermediate points in their lengths, struts secured to said rails near their deflections, tension members secured to the rails in front and rear of said deflections and sustaining said struts, said struts depending vertically from said rails, and means being provided to resist inward deflection of the struts.

3. In a vehicle frame, the combination of side rails having inward deflections at intermediate points in their length, struts secured to said rails near their deflections, tension members secured to the rails in front and rear of said deflections and sustaining said struts, said struts depending vertically from said rails, means being provided to resist inward deflection of the struts consisting of a transverse spacing beam, and means for bracing the same.

4. In a vehicle frame comprising side rails formed with inward deflections at intermediate points in their length, struts sustaining said side rails vertically near their deflections, tension members secured to the side rails in front and rear of said struts, a spacing beam spreading the lower ends of the struts apart, and braces for said spacing beam.

5. In a vehicle frame, the combination of outer rails having inward deflections at intermediate points of their length, inner rails spaced from said outer rails at said deflections, struts secured to the outer rails near their deflections and affording vertical support thereto, tension members sustaining said struts and having their ends secured to said outer rails, a spacing beam extending transversely of the frame between the lower ends of said struts, and diagonal braces between said spacing beam and the inner rails of the frame.

6. In a vehicle frame, the combination of outer rails having inward deflections at intermediate points of their length, inner rails spaced from said outer rails at said deflections, struts secured to the outer rails near their deflections and affording vertical support thereto, tension members sustaining said struts and having their ends secured to said outer rails, a spacing beam extending transversely of the frame between the lower ends of said struts, diagonal braces between said spacing beam and the inner rails of the frame, and tie rods between the inner and outer rails near the vertical plane of said braces.

7. In a vehicle frame, the combination of outer rails having inward deflections at intermediate points of their length, inner rails spaced from said outer rails at said deflections, struts secured to the outer rails near their deflections and affording vertical support thereto, tension members sustaining said struts and having their ends secured to said outer rails, a spacing beam extending transversely of the frame between the lower ends of said struts, diagonal braces between said spacing beam and the inner rails of the frame, and tie braces extending from the upper portions of the braces first named inwardly and downwardly to the spacing beam.

8. In a vehicle frame having side rails inwardly deflected at intermediate points in their length, trussing structures beneath the rails near their deflections bracing said frame vertically, and transverse braces maintaining said trussing structures beneath the deflections of the side rails.

9. In a vehicle frame, outer rails deflected at intermediate points of their length and thereby providing a reduced end of the frame, inner rails merged with the portions of the outer rails forming the reduced end and extending longitudinally therefrom, tie rods spacing the inner rails from the outer rails at points near the deflections of the outer rails, and sustaining trusses adjacent said deflections sustained by both the inner and outer rails.

10. A vehicle frame comprising inner and outer rails, with the outer rails deflected inwardly to meet the inner rails and provide a transversely reduced forward end, and with the inner rails projecting rearwardly from said reduced forward end and spaced inwardly from the rear portions of said outer rails, and a box-like bracing structure introduced between said outer rails and firmly secured to all of the rails.

11. A vehicle frame comprising inner and outer rails, with the outer rails deflected inwardly to meet the inner rails and provide a transversely reduced forward end, and with the inner rails projecting rearwardly from said reduced forward end and spaced inwardly from the rear portions of said outer rails, and a box-like bracing structure introduced between said outer rails and firmly secured to all of the rails, said inner rails being provided in rear of said box-like structure with a cross beam that connects them with the outer rails.

12. A vehicle frame comprising inner and outer rails, with the outer rails deflected inwardly to meet the inner rails and provide a transversely reduced forward end, and with the inner rails projecting rearwardly from said reduced forward end and spaced inwardly from the rear portions of said outer rails, and a box-like bracing structure introduced between said outer rails and firmly secured to all of the rails, said frame having vertically and transversely acting trusses forward of said box-like structure and adjacent to the deflections in the outer rails.

13. A vehicle frame comprising inner and outer rails, with the outer rails deflected inwardly to meet the inner rails and provide a transversely reduced forward end, and with the inner rails projecting rearwardly from said reduced forward end and spaced inwardly from the rear portions of said outer rails, and a box-like bracing structure introduced betwen said outer rails and firmly secured to all of the rails, said box-like structure having box-like legs depending into the spaces between the inner and outer rails.

14. In a vehicle frame, the combination of the outer rails having inward deflections at intermediate points in their lengths, struts vertically supporting said outer rails at points near said deflections, tension members sustaining said struts and connected with said outer rails at points forward and rearward of said struts, and a box-like structure introduced between the outer rails and spacing them apart adjacent to the rear ends of said tension members.

Signed at Chicago, Illinois, this 22nd day of October, 1918.

M. VOLNEY LIDDELL.